No. 823,455. PATENTED JUNE 12, 1906.
J. R. WILLCOX.
LOAD LIMIT MECHANISM FOR ELEVATORS.
APPLICATION FILED MAY 9, 1905.

2 SHEETS—SHEET 1.

Junius R. Willcox, Inventor

Witnesses
George L. Bonney.

By Walter B. Burrow.
Attorney

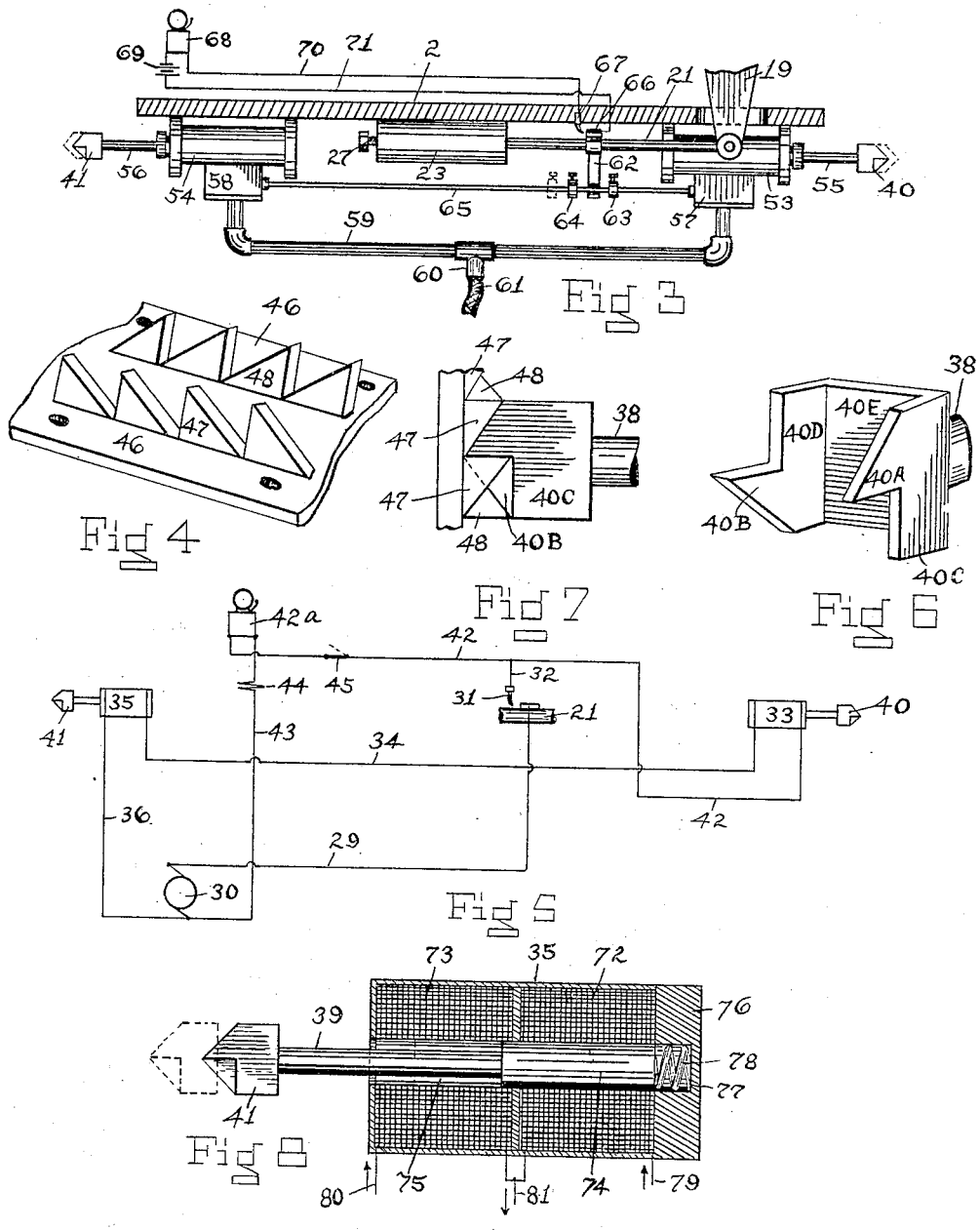

UNITED STATES PATENT OFFICE.

JUNIUS R. WILLCOX, OF NORFOLK, VIRGINIA.

LOAD-LIMIT MECHANISM FOR ELEVATORS.

No. 823,455.

Specification of Letters Patent.

Patented June 12, 1906.

Application filed May 9, 1905. Serial No. 259,512.

*To all whom it may concern:*

Be it known that I, JUNIUS R. WILLCOX, a citizen of the United States, residing at Norfolk, in the county of Norfolk and State of Virginia, have invented certain new and useful Improvements in Load-Limit Mechanism for Elevators, of which the following is a specification.

My invention relates to load-limit mechanism for elevators.

The object of my invention is to provide means for automatically locking an elevator when the load reaches beyond the factor of safety predetermined in constructing the elevator.

Further objects and advantages will be more fully understood by having recourse to the drawings forming a part of this specification, in which—

Figure 1:
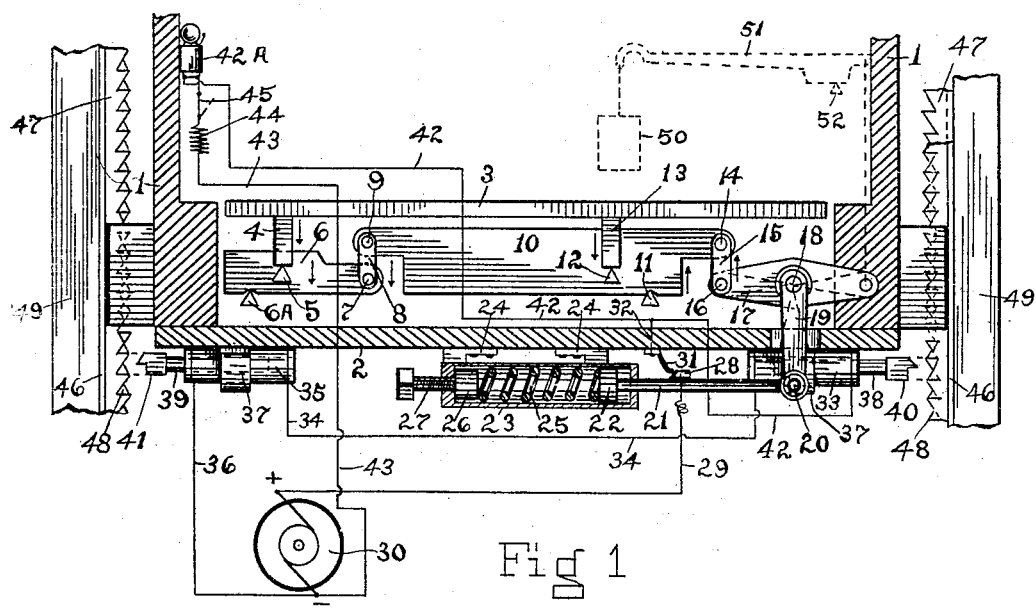
Figure 2:
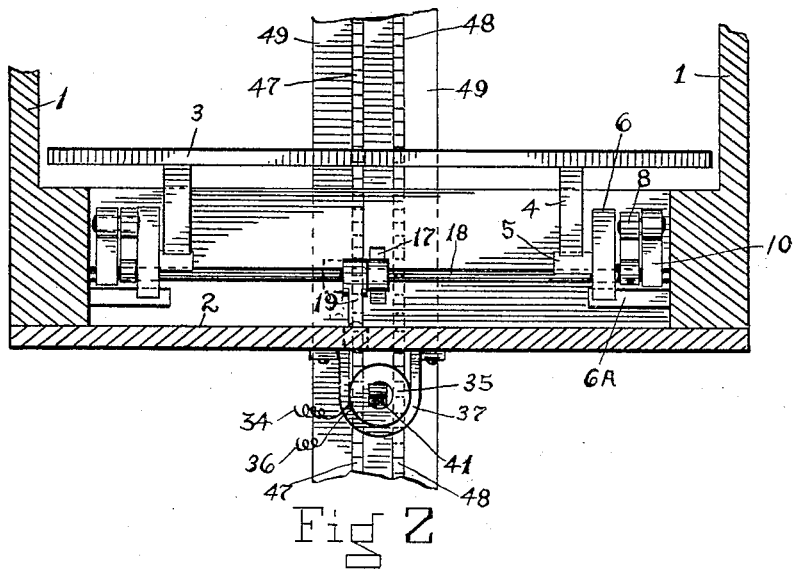

Figure 1 is a sectional elevation through a part of the cage and the lower floor of the elevator. Fig. 2 is an end sectional elevation of the same. Fig. 3 is a side elevation of the apparatus when operated by fluid-pressure.
Fig. 4 is a perspective view of the double rack or toothed bar. Fig. 5 is a diagrammatic view of the electric connections shown in Fig. 1. Fig. 6 is a front view in perspective of one of the jam-blocks or locking-heads. Fig.
30 7 is an enlarged side elevation of one of the locking-heads in engagement with both rows of teeth of the rack-bar. Fig. 8 is a sectional elevation of one of the solenoids.

In the drawings like reference-numerals
35 indicate similar parts in all the views.

1 is the cage or housing of the elevator and may be of any desired construction.

2 is a floor placed a suitable distance below the yieldable platform 3, the said platform being the means for actuating the hereinafter-described mechanism.

4 is a depending lug attached to the platform or floor 3, four of which are used, though only two on each side of the cage or frame 1 are shown, as in Fig. 2. The lug 4 bears upon the angular knife-edge pivot 5, attached to and near the center of the lever 6, which is fulcrumed on the knife-edge 6ᴬ, supported at some convenient point to a stationary part of the cage or frame 1, as shown in Fig. 2. On one of the levers 6 is a pin 7, to which is pivotally connected a link 8 at one of its ends, while its other end is connected to the pin 9 on one end of the central lever 10. The lever 10 is fulcrumed at 11 upon a wedge-shaped knife-edge pivot 11, attached at some fixed point on the housing or any convenient point. The lever is also provided with a knife-edge projection or pivot 12, which moves with it and is the bearing-point for depending lug 13, attached to the movable platform 3, so that any load upon it will be evenly distributed for a uniform depression necessary to operate the lever 6 and the lever-beam 17, which will be hereinafter described.

14 is a pin-joint at one end of the lever 10, to which is pivotally connected the link 15 and connects the lever 10 by means of the link and the pin 16 to the lever-beam or centrally-pivoted arm 17. The beam or arm 17 oscillates upon the rod or shaft 18 and extends from side to side under the platform 3 and suitably connected thereto.

19 is a rocker-arm moving coincidently with that of the beam 17 and is provided with a wrist-pin 20 on its lower end for connection with the plunger-rod 21.

22 is a plunger or piston working in the spring-cylinder 23 and supported beneath the floor 2 by the brackets 24.

25 is a spring contained in the cylinder or case 23, and during operation of the mechanism the spring-pressure is exerted against the adjusting-plug 26. By moving the screw 27 in and out the degree of compression of the spring is regulated and the load-limit upon the platform 3 is adjusted.

28 is a metal contact-block upon the plunger-rod 21 and is suitably insulated therefrom. The block 28 is connected by the wire 29 to the + pole of the dynamo-electric machine 30.

31 is a spring-tongue in striking alinement with the block 28 and is connected by the wire 32 to one end of the solenoid 33.

34 is a wire connecting the solenoid 33 with the solenoid 35 36, being the return-wire from one end of the solenoid 35 to the − pole of the dynamo 30.

The solenoids 33 and 35 are secured to the floor 2 by means of the straps 37 or in any other suitable manner.

38 and 39 are the cores of the solenoids 33 and 35, respectively, and are provided with angular jam-blocks or locking-heads 40 and 41, which will be more fully described hereinafter. The locking-heads 40 and 41 are provided with sloping lugs or teeth $40^A$ and $40^B$ Fig. 6, and are a part of the side plates $40^C$ and $40^D$.

$40^E$ is the back of the device, to which suitable rods are secured, as will be hereinafter described.

The teeth $40^A$ and $40^B$ are oppositely disposed so as to engage the rack-bar, which has also oppositely-disposed teeth for preventing the elevator from ascending or descending when overloaded.

42 is a shunt-wire connection from the tongue 31 to the bell $42^A$ or other indicating device, 43 being the return bell-wire to the −pole of the dynamo-electric machine 30, and 44 is a resistance inserted into the wire 43 for the purpose of cutting down the voltage from that required to operate the solenoids 33 and 35 to that of lesser pressure sufficient to operate the low-voltage bell.

45 is a switch for cutting the bell out of service, if required.

46 is a rack-plate having two rows of oppositely-disposed teeth. Those at 47 are for preventing the elevator from falling should the supporting-cable break, and those at 48 are for preventing the elevator from ascending if there is an overload upon the platform 3, as will be described hereinafter.

49 represent the vertical rack-beams and also form guideways for the elevator frame or cage 1.

50 (shown by dotted lines) represents a weight attached to one end of beam 51 and pivoted at 52, (also shown by dotted lines,) the object of which is to show the free end of the beam or arm 17 connected to the beam 51 by the vertical dotted lines when it is desired to ascertain the load upon the platform in the ordinary process of weighing.

I will now describe the operation of my invention when the locking devices are operated by the electric current, assuming that a load in excess of that intended for the elevator to bear is upon the platform 3 and that the arm 19 is moving to the left by the action of the levers 6 and 10, as indicated by the arrows in Fig. 1. After such movement of the arm 19, and consequently that of the rod 21, the block 28 comes in contact with the tongue 31, which completes the electric circuit, ringing the bell $42^A$ and causing the blocks 40 and 41 to be thrown outward, engaging both of the racks 47 and 48 and preventing the elevator from ascending or descending until the excess load is removed, at which period the extension of the spring 25 restores the apparatus to the normal condition by the return of the rod 21 to the right, thus breaking the electric connection and releasing the blocks 40 and 41 from the rack. It is usual for the block 28 to pass the tongue 31, and when it returns the bell $42^A$ is rung, as well as before the locking operation, to indicate that the stoppage was due to an overload and not from any disarrangement of the external mechanism of the elevator.

When the mechanism is operated by steam, compressed air, or hydraulic power, the previously-explained apparatus must be substituted by the cylinders 53 and 54, Fig. 3, and are provided with piston-rods 55 and 56, carrying the jam-blocks 40 and 41 at their ends. The cylinders are equipped with the usual steam or valve chests 57 and 58. The cylinders 53 and 54 are supplied with the fluid-pressure by means of the branch pipe 59, connected to the main pipe 60, all of the pipes described being supplied with pressure by the flexible connection or hose 61, leading to the boiler or pump.

62 is a tappet-arm carried by the plunger-rod 21, having a slot at its lower end, so as to move between the tappets 63 and 64 on the valve-operating rod 65.

66 is a contact-block on the plunger-rod 21 similar to that shown at 28 in Fig. 1 and operates in precisely the same manner, as well as the tongue 67, Fig. 3.

68 is a bell or other indicating device, and 69 is a battery or other source of electric current, the wires 70 and 71 being connected to the tongue 67 and the contact-blocks 66, respectively.

The mechanism shown in Fig. 3 is put into action. When the movement of the arm 19 takes place toward the left, the tappet-arm 62 moves the rod 65 by engaging with the tappet 64 and at the same time ringing the bell 68 by closing the circuit at the contact-points 66 and 67. When the overload on the platform 3, Fig. 1, is removed, the arm 62, Fig. 3, moves to the right by action of the spring in the case 23, which shuts off the pressure from the cylinders by moving the tappet 63 and the rod 65 to the normal position shown in Fig. 3.

The tappets 63 and 64 are adjustable on the rod 65 and are secured in place by the set-screws shown upon them.

As shown by the dotted lines at 50, 51, and 52, the lifting of the weight 50 being impracticable in elevator construction, the compression of the spring 25 is equivalent, as the spring may be so constructed according to known mathematical formula to be compressed or deflected a given amount equal to the foot-pounds of energy required to lift a weight on the end of the dotted lever 51. As this is a matter of construction it is deemed unnecessary to embody the principles involved into this specification.

In Fig. 8 I show a sectional elevation of one of the solenoids used in connection with the mechanism shown in Figs. 1 and 2. 72 and 73 are oppositely-acting coils wound around a hollow pipe or core, leaving a bore 75 for the reciprocation of the plunger 74, attached to the rod 39. 76 is an end piece having a cavity 77 for the spring 78, which is used to cushion the instroke of the plunger. The wires 79 and 80 are the feeders, while that at 81 is the common return for the two coils. The wiring and connections differ in practice according to the working conditions and may be changed according to circumstances.

Having described my invention, what I claim, and desire to secure by Letters Patent, is—

1. The combination in an elevator, of a frame, a yieldable platform supported on linked and pivoted beams or levers, and connecting means controlled by the beams for locking the frame in its path of movement by an excess of weight on said platform.

2. The combination in an elevator, of a frame, a floor thereto a yieldable floor above the first-named floor, a plurality of pivoted levers beneath the yieldable floor, and a plurality of reciprocating devices for locking the said frame in its ascent or descent when an excess load is upon the said yieldable floor.

3. The combination in an elevator, a frame or cage and its floor, a depressible platform above the floor, a series of pivoted link-connected levers under the said platform, a plurality of reciprocating mechanisms actuated by the said levers, means for locking the said frame in its ascent or descent and releasing the same according to the load on the platform, resilient means for cushioning the movement of the said levers, and means for adjusting the extent of the said cushioning effect.

4. The combination in an elevator, of a frame, a floor, a depressible resiliently-supported platform, a series of pivoted levers for supporting the said platform, a centrally-pivoted arm connected to the said levers, a depending arm at right angles thereto, a rod connected to the said arm, a piston on the said rod, an adjustable cushioning device for the piston, and reciprocating means controlled by the said pivoted levers for locking the said frame from movement and releasing the same according to the load on said platform.

5. The combination in an elevator, a depressible floor, a series of balanced knife-edge supported beams, a centrally-pivoted beam having an arm thereon, a rod connected thereto, a plunger or piston on one end of the rod, a cylinder inclosing and movably supporting the plunger, a spring in the said cylinder, means for compressing the spring according to the load on the depressible floor, a plurality of reciprocating devices for locking the said frame and floor from movement and releasing the same according to the extent of movement of the said balanced beams by the load on said floor.

6. An apparatus of the class described comprising a frame, a depressible floor or platform, a series of compensating pivoted levers for supporting the floor, a series of links connecting the levers, a centrally-pivoted arm, a depending lever thereon and moving coincidently therewith, a piston-rod on one end of the lever, a piston or plunger on the rod, a cylinder for movably inclosing the piston, a spring in the cylinder, means for compressing the spring a degree equal to the load on the depressible floor, screw means for adjusting the depression of the spring, an insulated contact-block on the said piston-rod, a contact-tongue on the frame in striking alinement with the block, a plurality of solenoids on each side of the frame, a reciprocating core in each solenoid having angular locking heads or blocks thereon, means for completing an electric circuit by movement of the piston-rod to operate the cores for stopping the frame in its movement when overloaded, and means for operating said solenoids.

7. An apparatus of the class described comprising a frame, vertical guideways therefor, a rack on the guideways having rows of oppositely-disposed teeth, a depressible platform on the frame, a series of compensating pivoted levers beneath the platform, a rocking centrally-pivoted lever between and connected to the said compensating levers, an arm on the centrally-pivoted lever, a piston-rod connected to the arm, a plunger or piston on the rod, a case or cylinder, a spring in the said case, a contact-block on the said rod, a spring-contact tongue in striking alinement with said block, a plurality of solenoids under the said frame having reciprocating cores therein, a locking or jam block on one end of each core, means for supplying an electric current for completing the circuit by the said contact-block and the tongue when the said rod is moved for causing the jam-blocks to engage the oppositely-disposed rows of teeth of the rack, means for compressing the said spring in the case to its maximum predetermined extent simultaneously with the operation of the solenoids.

8. An apparatus of the class described and in combination with a plurality of shaft-guide beams, a car or platform movably supported therein, rack-bars on said shaft-beams having rows of oppositely-disposed teeth, and locking-heads carried by the car or platform having oppositely-disposed teeth adapted to engage and disengage said rack-bars.

9. An apparatus of the class described and in combination with vertical beams in the elevator-shaft, a car or platform movably positioned between said beams, rack-bars on the beams having a double row of oppositely-disposed teeth, locking-heads carried by the car or platform having teeth adapted to correspond with the rack-teeth for locking the car when ascending or descending, and means for reciprocating said locking-heads In testimony whereof I have hereunto affixed my signature, in the presence of two witnesses, this 6th day of May, 1905.

JUNIUS R. WILLCOX.

Witnesses:
 WALTER B. BURROW,
 LOULIE L. SHARP.